US011397165B2

(12) United States Patent
Hirakawa et al.

(10) Patent No.: US 11,397,165 B2
(45) Date of Patent: Jul. 26, 2022

(54) ANALYZER

(71) Applicant: SHARP KABUSHIKI KAISHA, Sakai (JP)

(72) Inventors: Chika Hirakawa, Sakai (JP); Tadashi Iwamatsu, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 244 days.

(21) Appl. No.: 16/892,832

(22) Filed: Jun. 4, 2020

(65) Prior Publication Data

US 2020/0393409 A1    Dec. 17, 2020

(30) Foreign Application Priority Data

Jun. 17, 2019  (JP) .............................. JP2019-112123

(51) Int. Cl.
| | |
|---|---|
| *G01N 27/622* | (2021.01) |
| *H01J 49/04* | (2006.01) |
| *H01J 49/14* | (2006.01) |
| *G01N 30/72* | (2006.01) |

(52) U.S. Cl.
CPC ......... *G01N 27/622* (2013.01); *G01N 30/724* (2013.01); *H01J 49/0445* (2013.01); *H01J 49/145* (2013.01)

(58) Field of Classification Search
CPC .... G01N 27/622; G01N 30/724; G01N 27/62; G01N 30/72; H01J 49/0445; H01J 49/145; H01J 49/147

USPC ......................................... 250/281, 282, 288
See application file for complete search history.

(56) References Cited

U.S. PATENT DOCUMENTS 10,782,265 B2 *  9/2020  Komaru ............... G01N 27/624
2017/0328863 A1   11/2017  Yasuno et al.

FOREIGN PATENT DOCUMENTS

| JP | 2015-018637 A | 1/2015 |
| WO | 2016/079780 A1 | 5/2016 |

* cited by examiner

*Primary Examiner* — Michael Maskell
(74) *Attorney, Agent, or Firm* — ScienBiziP, P.C.

(57) ABSTRACT

An analyzer according to the present invention includes an electron emission element, a detector, an electric field generator, an electrostatic gate electrode, and a controller, in which the electron emission element includes a lower electrode, a surface electrode, and an intermediate layer, and directly or indirectly generates anions by electrons emitted in an ionization region between the electron emission element and the electrostatic gate electrode, the electrostatic gate electrode controls injection of the anions into a drift region between the electrostatic gate electrode and the detector, the detector detects the anions move through the drift region by a potential gradient, and the controller applies a pulse voltage between the lower electrode and the surface electrode, and applies a voltage to the electrostatic gate electrode such that the electrostatic gate electrode injects the anions into the drift region during a time when the pulse voltage is on.

13 Claims, 8 Drawing Sheets

ANALYZER

BACKGROUND OF THE INVENTION

Field of the Invention

The present invention relates to an analyzer.

Description of the Background Art

Ion mobility spectroscopy (IMS) is known, in which anions are separated and detected in a way that anions obtained by ionizing components contained in a sample are moved in a gas to which an electric field is applied (e.g. see WO2016/079780A1).

In ion mobility spectroscopy, generally components contained in a sample are ionized using corona discharge.

In addition, an electron emission element is known, in which an intermediate layer is disposed between an electrode substrate and a surface electrode (e.g. see Japanese Patent Application Publication No. 2015-18637).

When corona discharge is used for ionization of components contained in a sample, particularly when negative ions are generated, a large amount of substances as noise sources, such as nitrogen oxide, ozone, and electromagnetic wave are generated during the IMS-based gas analysis, due to characteristics of corona discharge. On the other hand, it is known that an ionization source using an electron emission element makes it possible to significantly suppress generation of substances as above-described noise sources.

However, in a case of ionization using an electron emission element in atmosphere, a lifetime of the electron emission element is shorter than in a case of corona discharge, and therefore it is difficult to maintain a stable performance over a long time.

The present invention has been made in view of above circumstances, and provides an analyzer that allows stable measurement over a long time by shortening a driving time of the electron emission element.

SUMMARY OF THE INVENTION

The present invention provides an analyzer including an electron emission element, a detector, an electric field generator that generates a potential gradient in a region between the electron emission element and the detector, an electrostatic gate electrode disposed between the electron emission element and the detector, and a controller, in which the electron emission element includes a lower electrode, a surface electrode, and an intermediate layer disposed between the lower electrode and the surface electrode, and emits electrons by applying a voltage between the lower electrode and the surface electrode, and directly or indirectly generates anions by electrons emitted in an ionization region between the electron emission element and the electrostatic gate electrode, the electrostatic gate electrode controls injection of the anions into a drift region between the electrostatic gate electrode and the detector, the detector detects the anions that moves through the drift region by the potential gradient, and the controller applies a pulse voltage between the lower electrode and the surface electrode, and applies a voltage to the electrostatic gate electrode such that the electrostatic gate electrode injects the anions into the drift region during a time when the pulse voltage is on.

In the analyzer according to the present invention, a pulse voltage is applied between the lower electrode and the surface electrode of the electron emission element to emit electrons into the ionization region to ionize components contained in a sample, so that a driving time of the electron emission element is shortened and a life characteristic of the electron emission element is improved.

DESCRIPTION OF THE PREFERRED EMBODIMENTS

The analyzer according to the present invention includes an electron emission element, a detector, an electric field generator that generates a potential gradient in a region between the electron emission element and the detector, an electrostatic gate electrode disposed between the electron emission element and the detector, and a controller, in which the electron emission element includes a lower electrode, a surface electrode, and an intermediate layer disposed between the lower electrode and the surface electrode, and emits electrons by applying a voltage between the lower electrode and the surface electrode, and directly or indirectly generates anions by electrons emitted in an ionization region between the electron emission element and the electrostatic gate electrode, the electrostatic gate electrode controls injection of the anions into a drift region between the electrostatic gate electrode and the detector, the detector detects the anions that moves through the drift region by the potential gradient, and the controller applies a pulse voltage between the lower electrode and the surface electrode, and applies a voltage to the electrostatic gate electrode such that the electrostatic gate electrode injects the anions into the drift region during a time when the pulse voltage is on.

Preferably, the controller turns off the pulse voltage applied between the lower electrode and the surface electrode at a timing after the injection of the anions into the drift region but before the subsequent injection of the anions into the drift region. Preferably, the controller turns off the pulse voltage at a timing between the injection of the anions into the drift region and e.g. 10 milliseconds after the injection. Thereby, a driving time of the electron emission element is shortened and a life characteristic of the electron emission element is improved.

Preferably, a pulse width of the pulse voltage applied between the lower electrode and the surface electrode is e.g. 1 millisecond or more and 30 milliseconds or less. Thereby the driving time of the electron emission element is shortened and the life characteristic of the electron emission element is improved.

Preferably, the analyzer according to the present invention includes a drift gas injection port that injects the drift gas into the analyzer, and an exhaust port that exhausts the gas in the analyzer. In addition, preferably, the drift gas injection port and the exhaust port are disposed such that the drift gas flows from the detector side toward the electrostatic gate electrode side in the drift region. Thereby, a non-ionized gas is prevented from flowing into the drift region, and adsorption of noises and the gas are suppressed.

The analyzer according to the present invention includes a first sample injection port that injects a sample gas into the analyzer. Preferably, the first sample injection port feeds the sample gas into the ionization region from a second opening on a lateral side of the ionization region. Thereby, a large amount of the sample gas is sent to a surface of the electron emission element, and the sample gas to be ionized is increased, so that a peak of a detected waveform is high.

Preferably, the second opening is disposed at a position where the center of the second opening overlaps the surface electrode of the electron emission element.

Preferably, the exhaust port exhausts the gas from a first opening on the lateral side of the ionization region. Thereby, the sample gas and the drift gas in an analysis chamber are exhausted, and a flow of the sample gas and a flow of the drift gas are generated in the analysis chamber.

Preferably, the first opening is disposed at a position where the center of the first opening overlaps the surface electrode of the electron emission element. Thereby, the non-ionized sample gas and the drift gas are efficiently exhausted.

Preferably, the analyzer according to the present invention includes a second sample injection port that injects a sample into the analyzer. Preferably, the second sample injection port feeds the sample to a side of the ionization region of the electron emission element and a space opposite to the side of the ionization region. Thereby, components contained in the sample gas are prevented from adhering to the surface electrode of the electron emission element, and an electron emission characteristic of the electron emission element is prevented from changing.

Also, the present invention provides an analyzer including an electron emission element having a lower electrode, a surface electrode, and an intermediate layer disposed between the lower electrode and the surface electrode, a detector, an electric field generator that generates a potential gradient in a region between the electron emission element and the detector, an electrostatic gate electrode disposed between the electron emission element and the detector, and a second sample injection port that injects a sample into the analyzer, in which the second sample injection port feeds the sample to a side of the electrostatic gate electrode of the electron emission element and a space opposite to the side of the electrostatic gate electrode.

Hereinafter, the present invention will be explained in more detail with reference to a plurality of embodiments. Configurations presented in the figures and the following description are merely examples, and the scope of the present invention is not limited to constituents presented in the figures and the following description.

Figure 1:
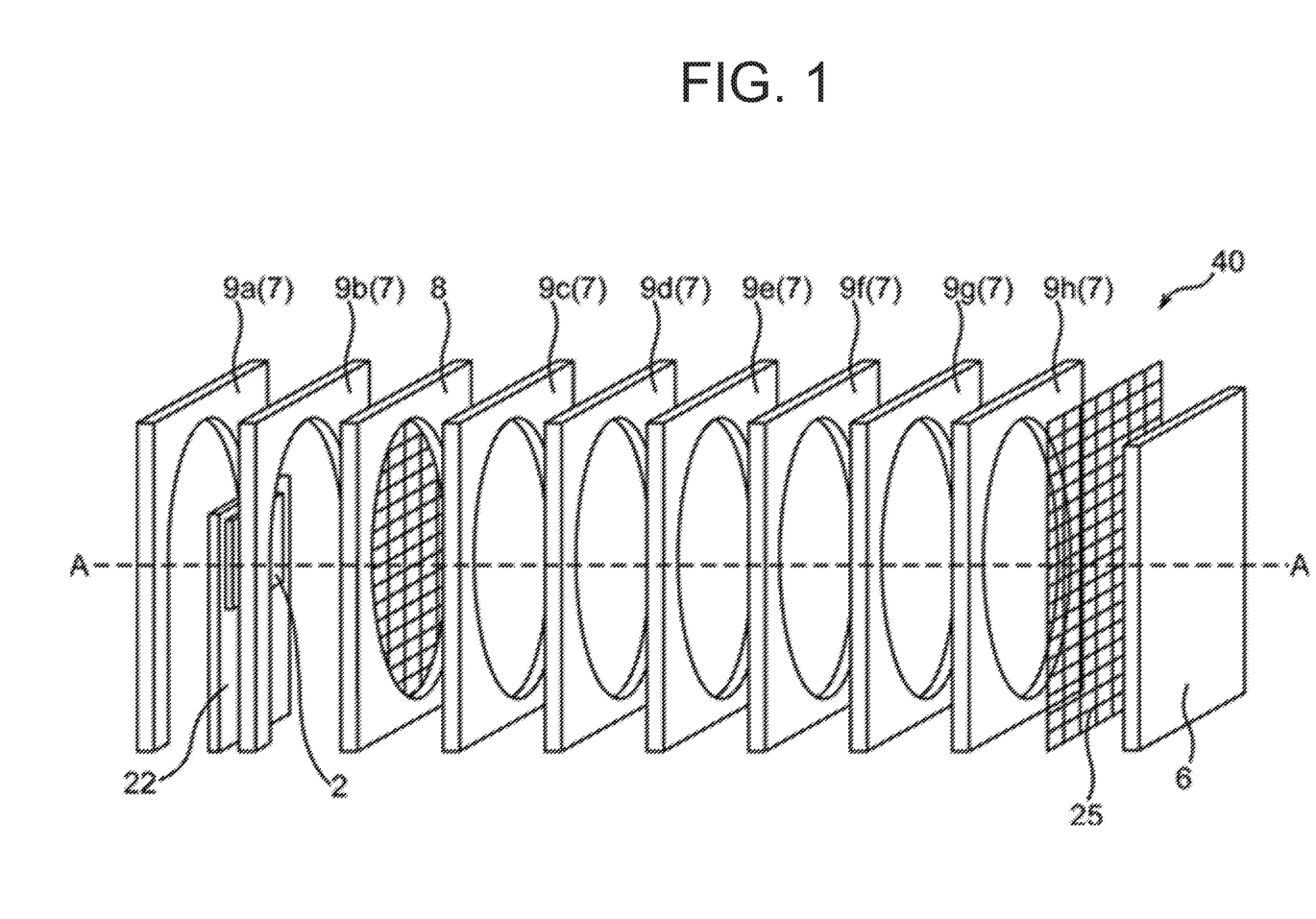
FIG. 1 is a schematic perspective view of an analyzer according to an embodiment of the present invention.
Figure 2:
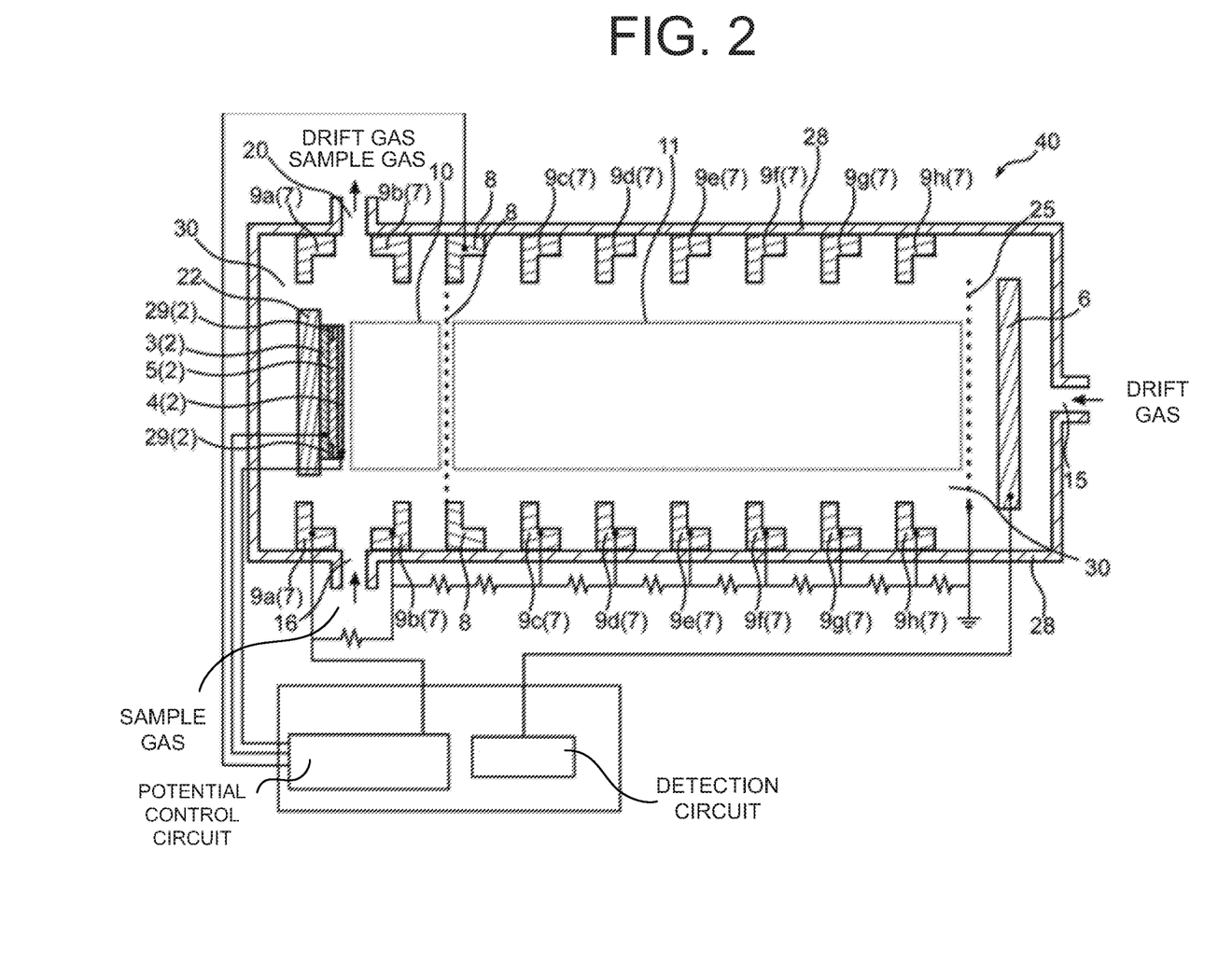
FIG. 2 is a schematic sectional view of the analyzer taken along a dashed line A-A in FIG. 1.

FIG. 1 is a schematic perspective view of the analyzer according to the embodiment, and FIG. 2 is a schematic sectional view of the analyzer taken along the dashed line A-A in FIG. 1. Also, in FIG. 2, an electrical configuration of the analyzer according to the embodiment is illustrated by a block diagram.

An analyzer 40 according to the embodiment includes an electron emission element 2, a detector 6, and an electric field generator 7 that generates a potential gradient in a region between the electron emission element 2 and the detector 6, an electrostatic gate electrode 8 disposed between the electron emission element 2 and the detector 6, and a controller 12.

The electron emission element 2 includes a lower electrode 3, a surface electrode 4, and an intermediate layer 5 disposed between the lower electrode 3 and the surface electrode 4, and emits electrons by applying a voltage between the lower electrode 3 and the surface electrode 4, and directly or indirectly generates anions by electrons emitted in an ionization region 10 between the electron emission element 2 and the electrostatic gate electrode 8.

The electrostatic gate electrode 8 controls injection of the anions into a drift region 11 between the electrostatic gate electrode 8 and the detector 6.

The detector 6 detects the anions that moves through the drift region 11 by the potential gradient.

The controller 12 applies a pulse voltage between the lower electrode 3 and the surface electrode 4, and applies a voltage to the electrostatic gate electrode 8 such that the electrostatic gate electrode 8 injects the anions into the drift region 11 during a time when the pulse voltage is on.

Also, the analyzer 40 may include a sample injection port 16 or a drift gas injection port 15.

The analyzer 40 according to the embodiment is a device that analyzes a sample by ion mobility spectroscopy (IMS). The analyzer 40 may be an ion mobility spectrometer.

The sample to be analyzed by the analyzer 40 may be a gas or a liquid.

The controller 12 is a section that controls the analyzer 40. The controller 12 may include e.g. a microcontroller having a central processing unit (CPU), a memory, a timer, an input/output port, and the like. Also, the controller 12 may include a power supply, a potential control circuit, a detection circuit, and the like.

The analyzer 40 according to the embodiment includes an analysis chamber 30 that analyzes components contained in a sample, and the analysis chamber 30 includes the ionization region 10 that ionizes the components contained in the sample to generate anions between the electron emission element 2 and the detector 6, and the drift region 11 to separate the anions. The ionization region 10 and the drift region 11 are partitioned by the electrostatic gate electrode 8. In addition, at the end of the ionization region 10 opposite to the electrostatic gate electrode 8, the electron emission element 2 is disposed such that the surface electrode 4 is on the ionization region side. Also, at the end of the drift region 11 opposite to the electrostatic gate electrode 8, the detector 6 is disposed.

The sample injection port 16 is a section that injects a sample into the analysis chamber 30. Components contained in the injected sample are analyzed by ion mobility spectroscopy. When the sample is a gas, the sample injection port 16 continuously feeds the sample gas into the analysis chamber 30. In addition, when the sample is a liquid, the sample injection port 16 may include a vaporization chamber, so that the sample gas vaporized in the vaporization chamber is fed to the analysis chamber 30. In addition, the sample injection port 16 may inject the liquid sample into the analysis chamber 30 maintained at a temperature higher than that at the boiling point of the sample to vaporize the sample in the analysis chamber 30. In addition, the sample injection port 16 may inject a sample previously separated using a separator, such as a gas separated by gas chromatography and a liquid separated by liquid chromatography, into the analysis chamber 30. In addition, the sample injection port 16 may feed the sample gas into the analysis chamber 30 from an opening (sample gas inlet) of a casing 28 on a lateral side of the ionization region 10.

The drift gas injection port 15 is a section that injects the drift gas into the analysis chamber 30. The drift gas is a gas, which flows in a direction opposite to the moving direction of the anions in the drift region 11 and serves as a resistance when the anions moves in the drift region 11. The drift gas may be dry air or an inert gas. Besides, $CO_2$ gas and a dopant for assisting ionization may be mixed into the gas. The drift gas injection port 15 may be disposed such that the gas in a compressed gas cylinder is injected into the analysis chamber 30, or such that the gas is injected into the analysis chamber 30 by means of a pump, or such that an exhaust port 20 forcibly exhausts the gas in the analysis chamber 30 to naturally draw the gas into the analysis chamber 30. In addition, the drift gas injection port 15 may be disposed such that the gas obtained after purifying the gas exhausted from the analysis chamber 30 by the exhaust port 20 is fed into the analysis chamber 30.

The exhaust port 20 is a section that exhausts the gas in the analysis chamber 30. The exhaust port 20 exhausts the drift gas and the sample from the analysis chamber 30. The exhaust port 20 may be disposed such that the gas in the analysis chamber 30 is forcibly exhausted by means of an exhaust fan or the like, or such that the gas in the analysis chamber 30 is naturally exhausted.

The sample injection port 16 and the exhaust port 20 may be disposed such that the sample gas flows across the ionization region 10. Thereby, in the ionization region 10, components contained in the sample gas are directly or indirectly ionized by electrons emitted from the surface electrode 4 of the electron emission element 2 to generate anions. For example, the ion injection port 16 may feed the sample gas to the ionization region 10 from an opening (sample inlet) of the casing 28 around the ionization region 10, and the exhaust port 20 may exhaust the sample gas from the opening (gas outlet) disposed on a portion (the casing 28 around the ionization region 10) opposite to the opening (sample inlet) to which the sample gas is fed.

The drift gas injection port 15 and the exhaust port 20 are disposed such that the drift gas flows from the detector side toward the electrostatic gate electrode side in the drift region 11. For example, the drift gas injection port 15 may feed the drift gas to the drift region 11 from the detector side, and the exhaust port 20 may exhaust the drift gas from the opening (gas outlet) of the casing 28 around the ionization region 10. Such an arrangement makes it possible to prevent the non-ionized gas from flowing into the drift region 11 to reduce noise sources and adhesion of the sample gas to the drift region. However, when there are not constraint conditions such as small noise and reduced adhesion of the sample gas to the drift region 11, the position of the drift gas injection port 15 is not particularly limited, the drift gas may be injected from the electron emission element 2 side, or the drift gas injection port 15 need not be disposed.

The electron emission element 2 is an element, which emits electrons from the surface electrode 4 and is intended to directly or indirectly ionize components contained in the sample by the emitted electrons to generate anions.

The electron emission element 2 includes the lower electrode 3, the surface electrode 4, and the intermediate layer 5 disposed between the lower electrode 3 and the surface electrode 4.

The surface electrode 4 is positioned on the surface of the electron emission element 2. The surface electrode 4 may have a thickness of preferably 40 nm or more and 100 nm or less. In addition, examples of a material of the surface electrode 4 include gold and platinum. In addition, the surface electrode 4 may be composed of a plurality of metal layers. Even when the surface electrode 4 has a thickness of 40 nm or more, the surface electrode 4 may have a plurality of openings, gaps, and a thinned portion having a thickness of 10 nm or less. The electrons which have passed through the intermediate layer 5 pass or penetrate through the openings, the gaps, and the thinned portion, and the electrons are emitted from the surface electrode 4. Such openings, gaps, and thinned portion are also formed by applying a voltage to between the lower electrode 3 and the surface electrode 4.

The lower electrode 3 is opposite to the surface electrode 4 via the intermediate layer 5. The lower electrode 3 may be a metal plate, or may be a metal layer or a conductor layer formed on an insulating substrate or a film. In addition, when the lower electrode 3 is made of a metal plate, the metal plate may be a substrate of the electron emission element 2.

Examples of a material of the lower electrode 3 include aluminum, stainless steel, and nickel. The lower electrode 3 has a thickness of e.g. 200 μm or more and 1 mm or less.

The intermediate layer 5 is a layer through which electrons flow owing to an electric field generated by applying a voltage to the surface electrode 4 and the lower electrode 3. The intermediate layer 5 may be semiconductive. The intermediate layer 5 may include at least one of a insulating resin, a conductive resin, a insulating fine particle, and a metal oxide. Also, the intermediate layer 5 preferably contains a conductive fine particle. The intermediate layer 5 may have a thickness of e.g. 0.5 μm or more and 1.8 μm or less.

The electron emission element 2 may have an insulating layer 29 between the surface electrode 4 and the lower electrode 3. The insulating layer 29 may have openings. The openings of the insulating layer 29 defines electron emission regions of the surface electrode 4. Since the electrons flow through the insulating layer 29, the electrons flow through the intermediate layer 5 corresponding to the openings of the insulating layer 29, and the electrons are emitted from the surface electrode 4. Thus, the electron emission regions formed on the surface electrode 4 are defined by disposing the insulating layer 29 having the openings. The electron emission region may be e.g. a 5 mm-square region, and is freely designed in accordance with sizes of the opening of the electrode 9 and a collector, and the like.

Each of the surface electrode 4 and the lower electrode 3 is electrically connected to the potential control circuit of the controller 12. When a potential of the lower electrode 3 is made substantially equal to a potential of the surface electrode 4 by using the potential control circuit, no current flows in the intermediate layer 5 and no electrons are emitted from the electron emission element 2 (the electron emission element 2 is turned off).

When a voltage is applied between the lower electrode 3 and the surface electrode 4 by using the potential control circuit such that the potential of the lower electrode 3 is lower than the potential of the surface electrode 4, a current flows through the intermediate layer 5, and electrons that have flowed through the intermediate layer 5 pass through the surface electrode 4, and are emitted into the ionization region 10 (the electron emission element 2 is turned on). The voltage applied between the lower electrode 3 and the surface electrode 4 may be e.g. 5 V or more and 40 V or less for turning on the electron emission element 2.

The potential control circuit of the controller 12 applies a pulse voltage between the lower electrode 3 and the surface electrode 4. The pulse voltage is a voltage at which the applied voltage shows a rectangular wave. The pulse voltage may have a single pulse wave or a continuous pulse wave. When continuously measuring the pulse voltage by the analyzer 40 and integrating measurement results, the pulse voltage may have a continuous pulse wave that continues for the number of measurements.

A long total driving time of the electron emission element 2 may deteriorate the surface electrode 4, the intermediate layer 5, or the like, and impair the electron emission characteristic of the electron emission element 2. Thus, the substantial driving time of the electron emission element 2 is shortened by applying a pulse voltage between the lower electrode 3 and the surface electrode 4, so that the life characteristic of the electron emission element 2 is improved. In addition, an ionization efficiency of the electron emission element 2 is improved by applying a pulse voltage between the lower electrode 3 and the surface electrode 4.

Figure 3:
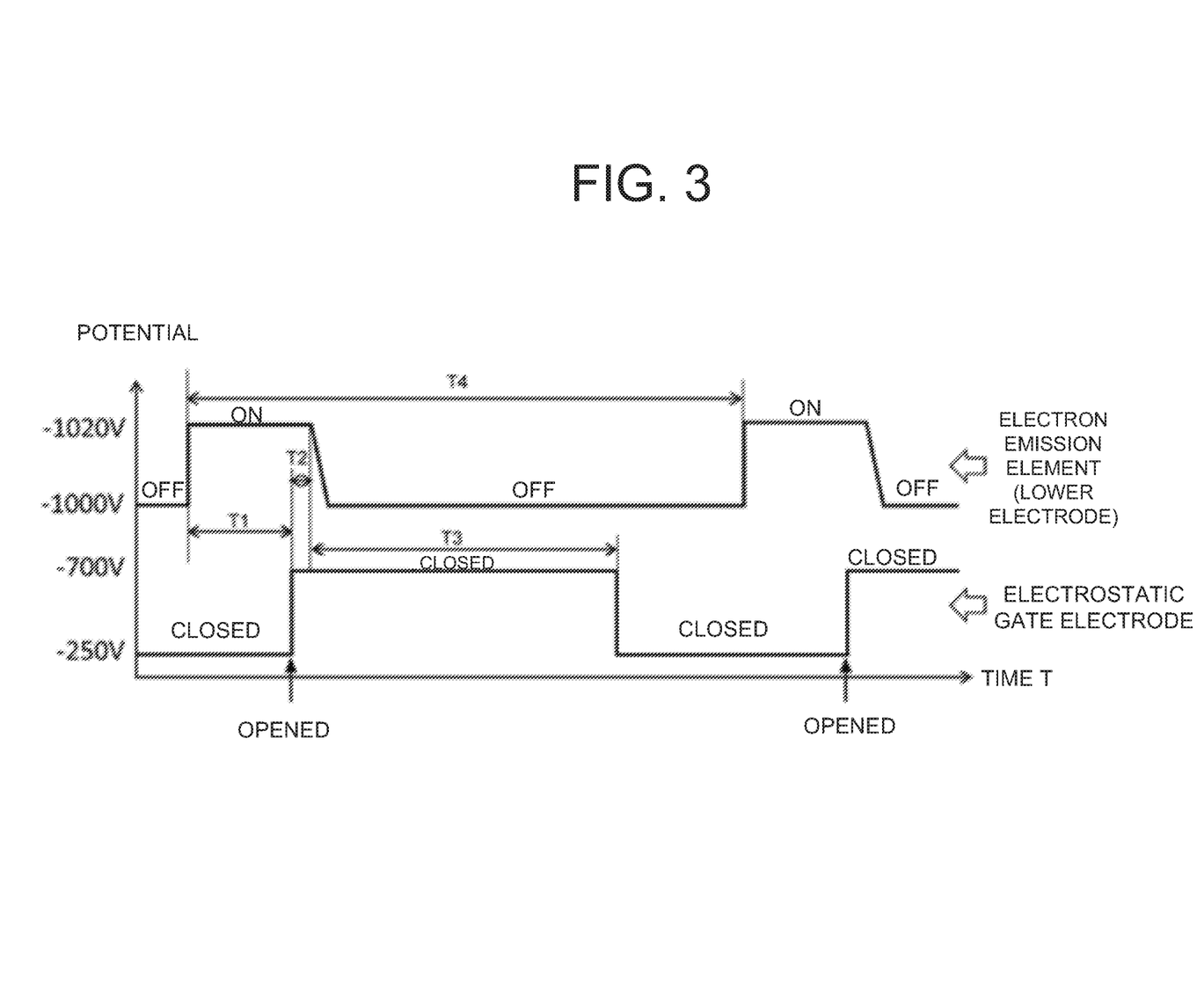
FIG. 3 is a timing chart of a voltage applied to an electron emission element and an electrostatic gate electrode.

For example, when the potential control circuit applies a voltage such that the potential of the surface electrode 4 is −1000 V, the electron emission element 2 may be turned off by applying a voltage with the potential control circuit such that the potential of the lower electrode 3 is −1000 V, and the electron emission element 2 may be turned on by applying a voltage with the potential control circuit such that the potential of the lower electrode 3 is −1020 V. In this case, the potential control circuit changes the voltage applied to the lower electrode 3 e.g. as presented in the timing chart in FIG. 3.

A pulse width of the pulse voltage applied between the lower electrode 3 and the surface electrode 4 by the potential control circuit may be e.g. 1 millisecond or more and 30 milliseconds or less.

The electrons emitted into the ionization region 10 immediately collide with gas molecules to generate anions of the gas molecules. Since the sample injection port 16 feeds the sample gas to the ionization region 10, when there are components contained in the sample gas around the surface electrode 4, the electrons emitted from the surface electrode 4 collide with the components contained in the sample gas to generate anions. In addition, when the drift gas is dry air, there is an abundance of oxygen gas around the surface electrode 4, and therefore the electrons emitted from the surface electrode 4 collide with oxygen gas to generate oxygen anions. The oxygen anions hand over electric charges to the components contained in the sample gas in the ionization region 10 to generate anions of the components contained in the sample gas. Thus, the anions of the components contained in the sample gas are indirectly generated in the ionization region 10 using the electron emission element 2.

The sample gas may be a gas containing one type of ionizable component or a gas containing multiple types of ionizable components.

When the sample gas contains multiple types of ionizable components, an anion of each component is generated in the ionization region 10. For example, when the sample gas contains three components A, B, and C, an anion of A, an anion of B, and an anion of C may be generated in the ionization region 10.

The generated anions move so as to approach the electrostatic gate electrode 8 by the potential gradient generated in the ionization region 10 using the electric field generator 7 and the electron emission element 2.

The electric field generator 7 is a section that generates a potential gradient in the region between the electron emission element 2 and the detector 6. The electric field generator 7 generates a potential gradient where the anions move from the electron emission element side toward the detector side. The electric field generator 7 may be composed of a plurality of electric field generating electrodes 9. A shape of the electric field generating electrodes 9 is not limited as long as a potential gradient is generated in the region between the electron emission element 2 and the detector 6, and the electric field generating electrodes 9 may be e.g. a ring-shaped electrode or an arched electrode. The plurality of electric field generating electrodes 9 are arranged in a line such that the ionization region 10 and the drift region 11 are formed inside the ring or arch. Also, each of the plurality of electric field generating electrodes 9 constituting the electric field generator 7 is electrically connected to the potential control circuit of the controller 12.

Adjacent two of the electric field generating electrodes 9 included in the electric field generator 7 are electrically connected to each other via a resistor interposed therebetween. Thereby, a potential difference is caused between the two adjacent electric field generating electrodes 9, and the potential difference between the respective electrodes generates a potential gradient in the region between the electron emission element 2 and the detector 6.

For example, in the analyzer 40 illustrated in FIG. 1 and FIG. 2, the electric field generator 7 is composed of a plurality of electric field generating electrodes $9a$ to $9h$, and the two adjacent electric field generating electrodes 9 are electrically connected to each other via a resistor interposed therebetween. A number and an arrangement interval of the electric field generating electrodes 9 may be increased or decreased depending on the target gas species. Among the plurality of electric field generating electrodes 9, the electrode $9h$ closest to the detector 6 is electrically connected to a grid electrode 25 via a resistor interposed therebetween. For example, the grid electrode 25 is grounded. In addition, a potential of the electrode $9a$ farthest from the detector 6 is controlled by the potential control circuit. For example, the potential control circuit applies a voltage such that the potential of the electrode $9a$ is e.g. −1080 V. In addition, since the grid electrode 25 is grounded, the grid electrode 25 is at 0 V. In addition, since the two adjacent electric field generating electrodes 9 are electrically connected to each other via the resistor interposed therebetween, the potential of the plurality of electric field generating electrodes 9 arranged in a line increases stepwise as approaching the detector 6. Thereby, such a potential gradient that the potential gradually increases as approaching the detector 6 in the area between the electron emission element 2 and the detector 6 (the ionization region 10 and the drift region 11) is generated. Note that the potential gradient changes in the vicinity of the electrostatic gate electrode 8 depending on the potential of the electrostatic gate electrode 8.

Additionally, in this case, the potential control circuit applies a voltage to the electron emission element 2 such that the potential of the electron emission element 2 (the surface electrode 5) is e.g. −1000 V. Incidentally, when the voltage applied to the electrode $9a$ is changed, the voltage applied to the electron emission element 2 should be changed in consideration of the potential gradient.

The electrostatic gate electrode 8 partitions the ionization region 10 and the drift region 11, and controls injection of the anions generated in the ionization region 10 into the drift region 11 by using the electrostatic interaction between the anions and the electrostatic gate electrode 8.

The electrostatic gate electrode 8 may be a ring-shaped electrode, preferably a grid electrode, and may be an electrode in which a grid electrode is disposed in the opening of the ring-shaped electrode. The electrostatic gate electrode 8 may be arranged in a line together with the plurality of electric field generating electrodes 9 constituting the electric field generator 7. The electrostatic gate electrode 8 is electrically connected to the potential control circuit of the controller 12. In addition, the electrostatic gate electrode 8 is provided to be capable of changing the potential gradient generated by the electric field generator 7.

The potential control circuit of the controller 12 changes the potential of the electrostatic gate electrode 8 to control the potential of the electrostatic gate electrode 8 such that the electrostatic gate electrode 8 can be switched between an open state and a closed state.

Figure 4A:
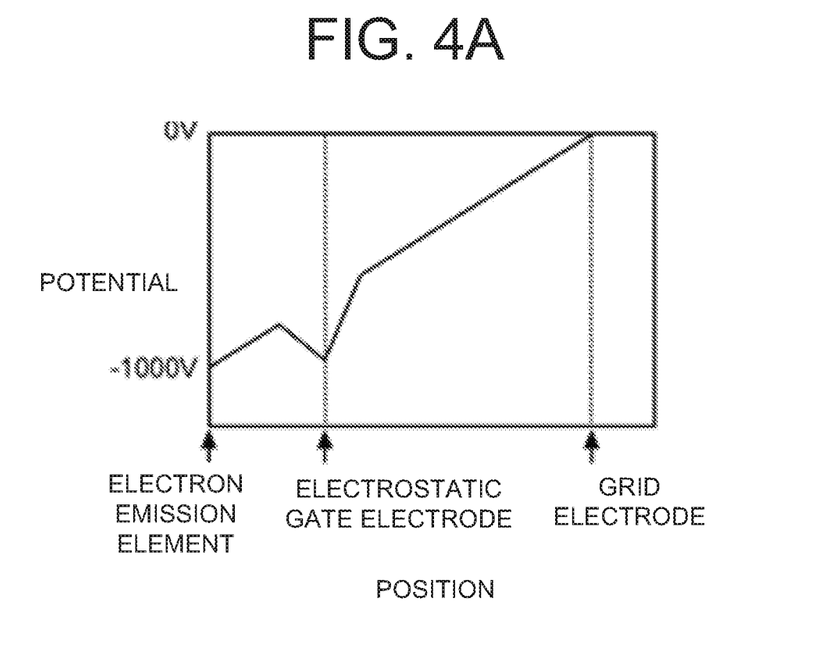
FIGS. 4A to 4C are graphs illustrating a potential gradient between the electron emission element and a detector.

For example, when the potential of the electrostatic gate electrode 8 is lower than that of the adjacent electric field generating electrode 9b on the electron emission element side, the potential gradient between the electron emission element 2 and the detector 6 (the grid electrode 25) is as illustrated in FIG. 4A. In this case, no anions in the ionization region 10 approach the electrostatic gate electrode 8 due to the electrostatic interaction and pass through the electrostatic gate electrode 8. Thus, the electrostatic gate electrode 8 is closed.

Figure 4B:
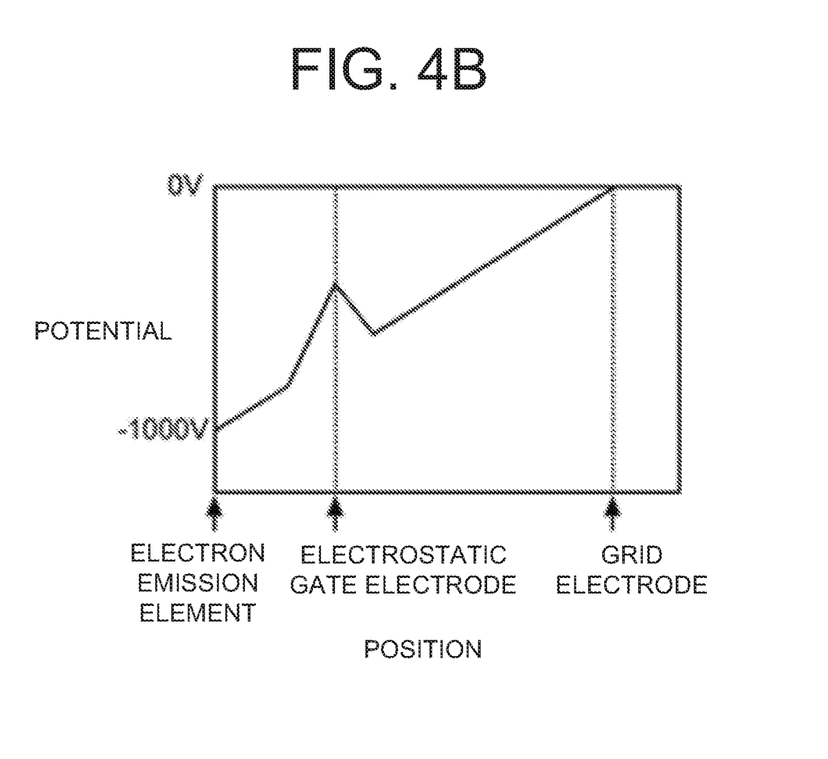

For example, when the potential of the electrostatic gate electrode 8 is higher than that of the adjacent electric field generating electrode 9c on the detector side, the potential gradient between the electron emission element 2 and the detector 6 (the grid electrode 25) is as illustrated in FIG. 4B. In this case, the anions in the ionization region 10 move so as to be attracted to the electrostatic gate electrode 8, and the electric charges of the anions move to the electrostatic gate electrode 8, so that the anions are neutralized. Thus, no anions pass through the electrostatic gate electrode 8, and the electrostatic gate electrode 8 is closed.

Figure 4C:
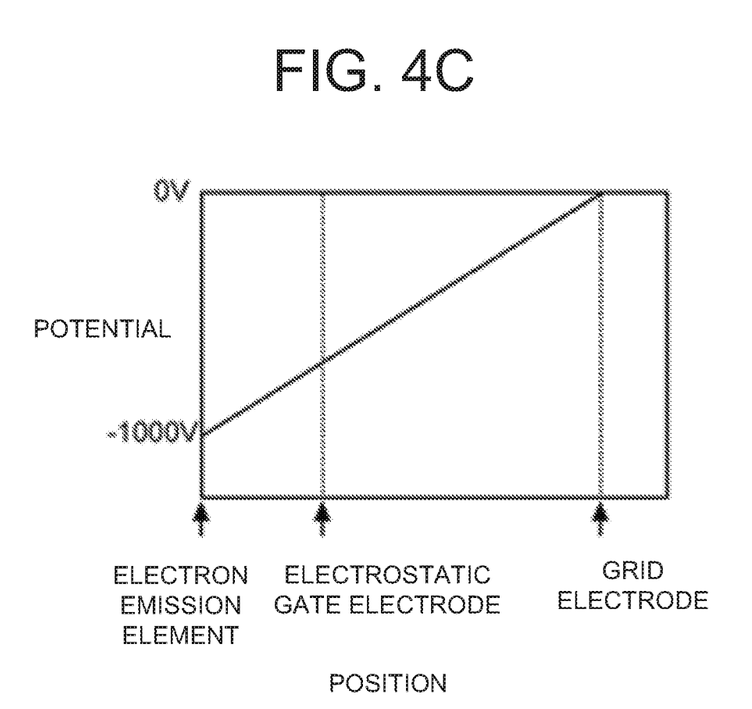

For example, when the potential of the electrostatic gate electrode 8 is higher than that of the adjacent electric field generating electrode 9b on the electron emission element side and lower than that of the adjacent electric field generating electrode 9c on the detector side, the potential gradient between the electron emission element 2 and the detector 6 (the grid electrode 25) is such a potential gradient that the potential gradually increases as approaching the detector 6 from the electron emission element 2, e.g. as illustrated in FIG. 4C. In this case, the anions in the ionization region 10 pass through the electrostatic gate electrode 8, and the electrostatic gate electrode 8 is opened.

When the voltage applied to the electrostatic gate electrode 8 is momentarily changed by the potential control circuit such that the potential changes from a potential higher than a potential range where the electrostatic gate electrode 8 is opened to a potential lower than the aforementioned potential range, or when the voltage applied to the electrostatic gate electrode 8 is momentarily changed by the potential control circuit such that the potential changes from a potential lower than a potential range where the electrostatic gate electrode 8 is opened to a potential higher than the aforementioned potential range, the electrostatic gate electrode 8 momentarily changes in an order of the closed state, the open state, and the closed state. Thus, by changing the voltage applied to the electrostatic gate electrode 8 using the potential control circuit as described above, the electrostatic gate electrode 8 is kept in the open state for a very short time, and the anions in the ionization region 10 can be injected into the drift region 11 for the short time. The time taken to inject the anions into the drift region 11 may be e.g. 0.1 microsecond or more and 0.1 millisecond or less. Thereby, a detected peak is sharpened.

The potential control circuit of the controller 12 applies a voltage to the electrostatic gate electrode 8 such that the electrostatic gate electrode 8 injects the anions into the drift region 11 during a time when the pulse voltage applied between the lower electrode 3 and the surface electrode 4 of the electron emission element 2 is on.

Since electrons are emitted from the surface electrode 4 of the electron emission element 2 during a time when the pulse voltage is on, anions are generated in the ionization region 10 at this time. Thus, at this time, the electrostatic gate electrode 8 is turned to an open state, so that the anions generated in the ionization region 10 are injected into the drift region 11. For example, when the electrostatic gate electrode 8 is turned to an open state by changing the potential of the electrostatic gate electrode 8 from −250 V to −700 V with the potential control circuit, the potential control circuit changes the voltage applied to the electrostatic gate electrode 8 at the timing as presented in the timing chart in FIG. 3.

When a pulse voltage is applied between the lower electrode 3 and the surface electrode 4, a lot of electrons are emitted from the surface electrode 4 immediately after the voltage is applied. Then, the amount of the emitted electrons gradually decreases and stabilizes.

When analyzing low-concentration components contained in the sample gas, the potential control circuit applies a voltage to the electrostatic gate electrode 8 such that the electrostatic gate electrode 8 is turned to the open state during the time when the amount of the electrons emitted immediately after the voltage application is large. Thereby, detection sensitivity of the analyzer 40 is improved.

When quantitatively analyzing the components contained in the sample gas, the potential control circuit applies a voltage to the electrostatic gate electrode 8 such that the electrostatic gate electrode 8 is turned to the open state during a time when the amount of the emitted electrons is stable. Thereby, accuracy of quantitative analysis is improved. In this case, for example, the electrostatic gate electrode 8 is turned to the open state after a certain time (T1) has elapsed after the electron emission element 2 is turned on, as presented in the timing chart in FIG. 3. For example, the controller 12 may apply a voltage to the electrostatic gate electrode 8 such that the electrostatic gate electrode 8 injects the anions into the drift region 11 at a timing at which a time of half the pulse width has elapsed after the pulse voltage applied between the lower electrode 3 and the surface electrode 4 is switched from off to on.

A time (T2) from the momentary open state of the electrostatic gate electrode 8 to the off-state of the electron emission element 2 is not particularly limited. The shorter this time is, the shorter the substantial driving time of the electron emission element 2 is, and therefore the shorter time is preferable, but the time depends on the design of the potential control circuit. T2 may be e.g. 10 milliseconds or shorter, preferably 10 microseconds or longer and 1 millisecond or shorter. In addition, if taking a design that the potential control circuit may be precisely controlled and noises due to the control are not caused, the timing for turning off the electron emission element 2 may be before the electrostatic gate electrode 8 is turned to the open state, because ions that have already reached around the electrostatic gate electrode are used for measurement. However, actually, it takes a high cost for a design with more precise control and no noises during control, and therefore T2 had better be controlled within the above range (as for the timing for turning off the electron emission element 2, a controllable timing and the like depend on the configuration of the circuit).

In a case that the measurement is repeated in a measurement period (T4), when a predetermined time (T3) has elapsed after finishing one measurement (anion reaches the detector 6), the potential of the electrostatic gate electrode 8 is restored to the initial potential (−250 V) by the potential control circuit.

The anions injected into the drift region 11 move toward the detector 6 in the drift region 11 owing to the potential gradient generated by applying a voltage to the electric field generator 7 and the grid electrode 25 with the potential control circuit. In addition, the drift gas that flows from the detector 6 side toward the electrostatic gate electrode 8 side in the drift region 11 serves as a resistance for the anions that flows from the electrostatic gate electrode 8 toward the detector 6. A level of the resistance (mobility of the ions) depends on an ion species. In general, since the mobility is inversely proportional to a collision sectional area of the ions, the larger the collision sectional area of the ions is, the longer it takes for the ion to reach the detector. Thus, a time (moving time, peak position) between injection of the anions into the drift region by the electrostatic gate electrode 8 and arrival of the anions to the detector 6 depends on the ion species of the anions. Thus, the anions (components contained in the sample) can be identified based on the moving time (peak position). Also, the anions of the plurality of components contained in the sample gas are separated in the drift region.

In addition, although the time taken for the anions to move from the electrostatic gate electrode 8 to the detector 6 depends on the design of the analyzer (distance from the gate to the detector, and applied voltage), the anions reach the detector 6 in a few milliseconds in a case of a small detector, and therefore one measurement with the analyzer 40 is finished in a few milliseconds.

The detector 6 detects the anions that move through the drift region 11 by the potential gradient. The detector 6 may have a metal collector that collects the electric charges of the anions. In addition, the collector may be electrically connected to a detection circuit of the controller 12. Also, the detection circuit measures a current generated by accumulation of the electric charges in the collector.

When the sample gas contains a plurality of components, the anion of each component is separated in the drift region 11 and reaches the detector 6, and therefore a detection curve of the detection circuit (change in measured value over time) has a peak corresponding to a moving time of each anion. Since the peak position (ion moving time) depends on the ion species, a type of the component contained in the sample gas can be identified. Also, a concentration of the component contained in the sample gas can be quantitatively analyzed from the peak area.

In addition, when one sample gas is continuously measured by the analyzer 40 multiple times, detection curves of the respective measurements may be integrated. Thereby, influence of electrical noises of the analyzer 40 is decreased, and therefore detection sensitivity is improved. The number of integrations may be e.g. 10.

The analyzer 40 can have the grid electrode 25 between the detector 6 (collector) and the drift region 11. In addition, disposition of the grid electrode 25 makes it possible to suppress occurrence of an image current.

Second Embodiment

Figure 5:
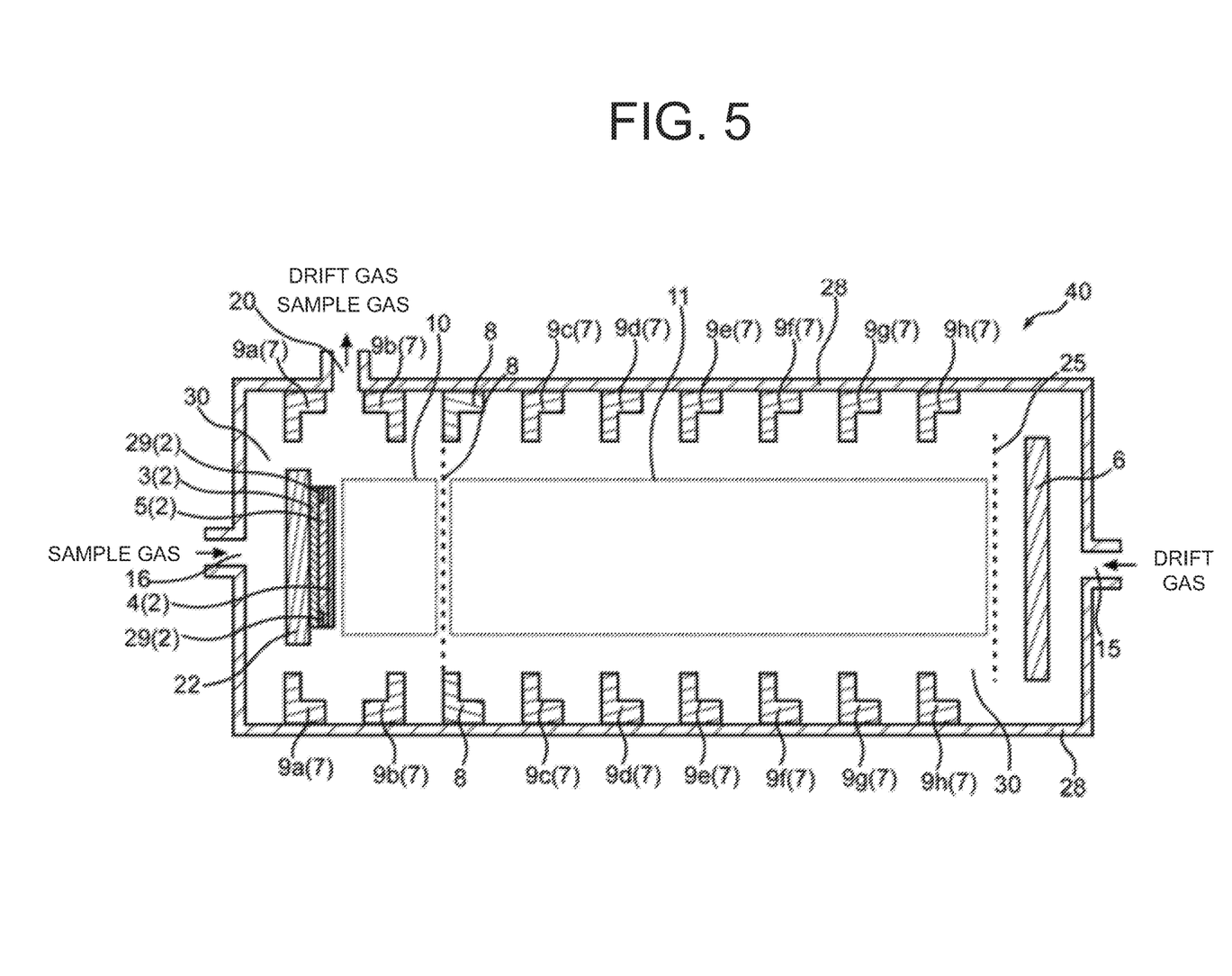
FIG. 5 is a schematic sectional view of the analyzer according to an embodiment of the present invention.

FIG. 5 is a schematic sectional view of the analyzer 40 according to the second embodiment.

In the second embodiment, the sample injection port 16 feeds the sample gas to the ionization region side of the electron emission element 2 and the analysis chamber 30 opposite to the ionization region side. For example, the sample injection port 16 feeds the sample gas into the analysis chamber 30 on the back side of the electron emission element 2 from the opening of the casing 28 opposite to the ionization region 10 side of the electron emission element 2. The sample gas fed to the analysis chamber 30 on the back side of the electron emission element 2 flows through the lateral side or the upper side of the electron emission element 2 to the ionization region 10. Then, in the ionization region 10, the components contained in the sample gas are ionized to generate anions.

Such a configuration of the sample injection port 16 makes it possible to prevent the components contained in the sample gas from adhering to the surface electrode 4 of the electron emission element 2, or the like. Thereby, changes in the electron emission characteristics of the electron emission element 2 are suppressed.

The aforementioned ion injection port 16 of the analyzer 40 according to the second embodiment is effective particularly for analyzing a sample gas that tends to contaminate the inside of the analyzer, such as a sample gas containing adsorbable components and a sample gas containing a high concentration of components to be analyzed.

In addition, the analyzer 40 may include both the ion injection port 16 described in the first embodiment, and the ion injection port 16 described in the second embodiment. In this case, the analyzer 40 is disposed so as to be switchable between the ion injection port 16 according to the first embodiment and the ion injection port 16 according to the second embodiment, depending on the sample.

Other configurations are the same as in the first embodiment. Also, the description about the first embodiment applies to the second embodiment unless inconsistency occurs.

Third Embodiment

Figure 6:
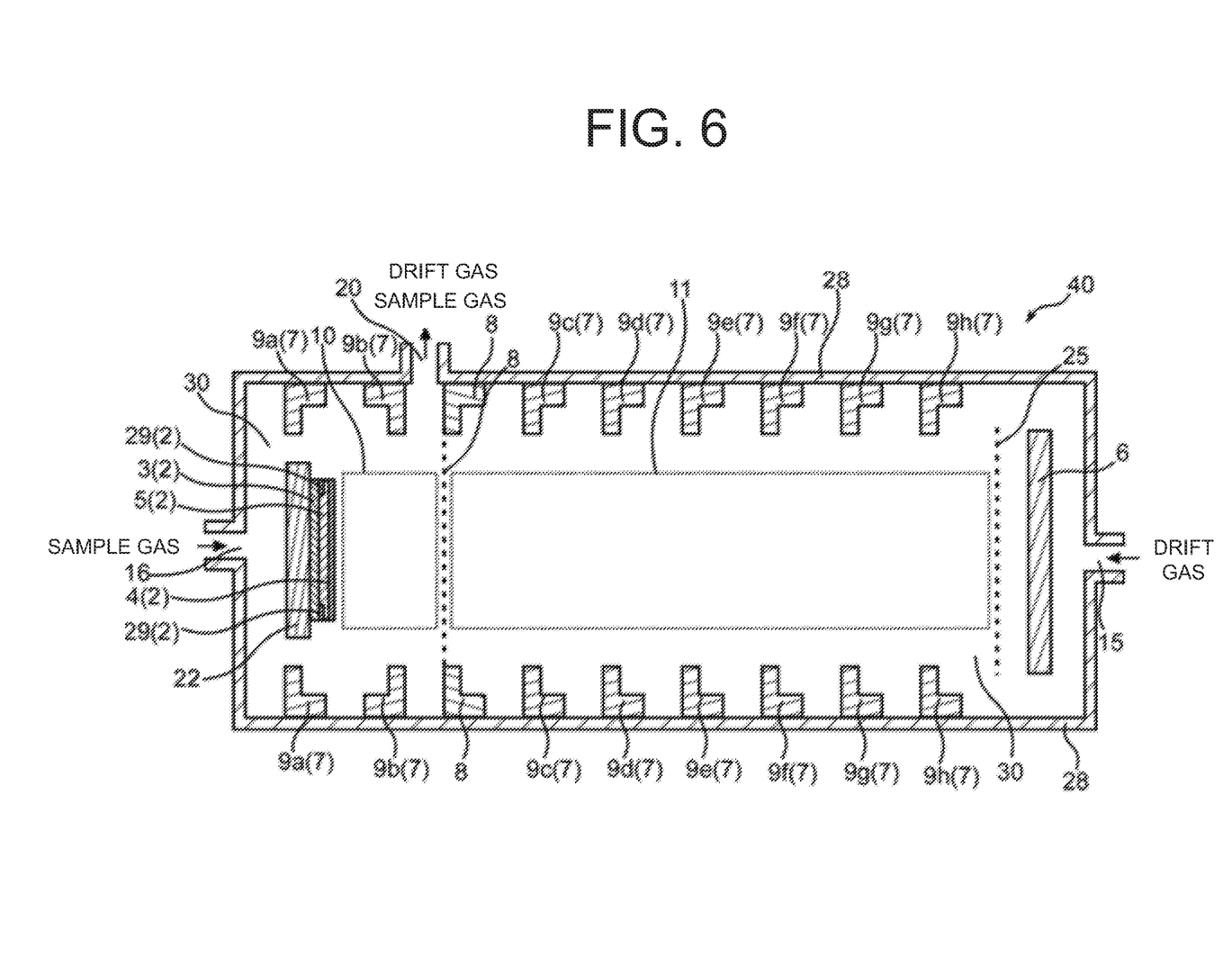
FIG. 6 is a schematic sectional view of the analyzer according to an embodiment of the present invention.

FIG. 6 is a schematic sectional view of the analyzer 40 according to the third embodiment.

In the third embodiment, the exhaust port 20 exhausts a gas from an opening (gas outlet) of the casing 28 on the lateral side of the ionization region 10. The opening is disposed at a position where the end of the opening on the electron emission element side is positioned closer to the electrostatic gate electrode than the electron emission element 2. In addition, the opening (gas outlet) of the exhaust port 20 can be disposed such that the center point of the opening is positioned closer to the electron emission element than the electrostatic gate electrode 8.

In addition, the exhaust port 20 exhausts the gas from between the electric field generating electrode 9b positioned closer to the electrostatic gate electrode 8 than the electron emission element 2 and the electrostatic gate electrode 8.

In addition, the ion injection port 16 feeds the sample gas to the analysis chamber 30 from the back side of the electron emission element 2 in the same manner as in the second embodiment.

Such a disposition of the gas outlet reduces the contact between the sample gas that passes through the ionization region 10 from the back side of the electron emission element 2 and the surface electrode 4 of the electron emission element 2. This makes it possible to suppress change in the element characteristics due to the adhesion of the components contained in the sample gas to the surface electrode 4, allowing stable analysis with the analyzer 40.

Other configurations are the same as in the first or second embodiment. Also, the description about the first or second embodiment applies to the third embodiment unless inconsistency occurs.

Fourth Embodiment

Figure 7:
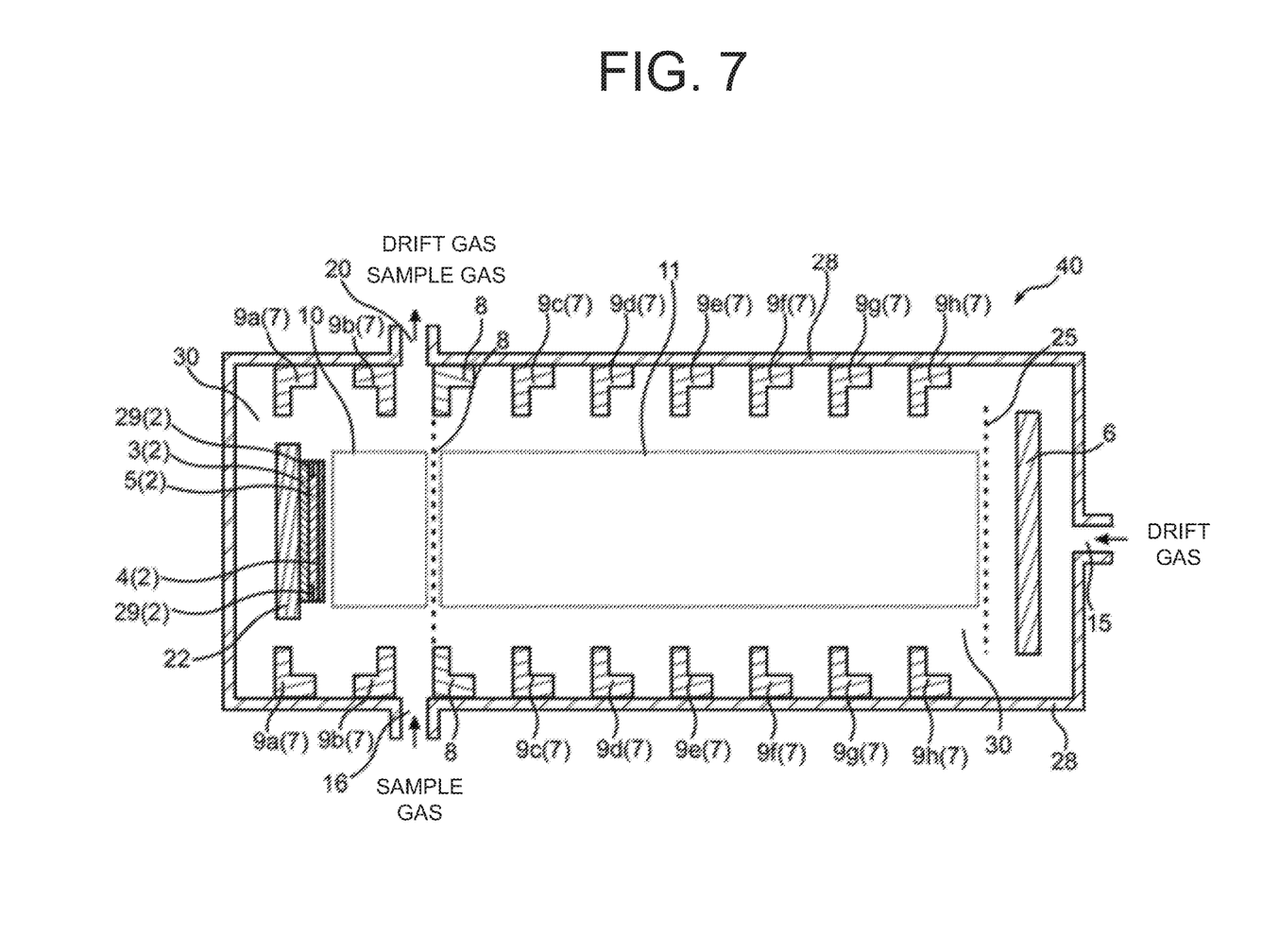
FIG. 7 is a schematic sectional view of the analyzer according to an embodiment of the present invention.

FIG. 7 is a schematic sectional view of the analyzer 40 according to the fourth embodiment.

In the fourth embodiment, in the same manner as in the third embodiment, the exhaust port 20 exhausts the gas in the analysis chamber 30 from the opening (gas outlet) of the casing 28 on the lateral side of the ionization region 10. The gas outlet is disposed such that the end of the opening on the electron emission element side is positioned closer to the electrostatic gate electrode than the electron emission element 2. In addition, the gas outlet of the exhaust port 20 is disposed such that the center point of the opening is positioned closer to the electron emission element than the electrostatic gate electrode 8.

The sample gas injection port 16 feeds the sample gas into the analysis chamber 30 from the opening (sample gas inlet) on the lateral side of the casing 28 opposite to the opening (gas outlet) of the exhaust port 20. In addition, the sample gas inlet of the sample gas injection port 16 may be disposed so as to be coaxial with the gas outlet of the exhaust port 20.

Such a gas piping layout makes it possible to prevent the components contained in the sample gas from adhering to the surface electrode 4 of the electron emission element 2. Even if a concentration of an analysis component contained in the sample gas is low, the analysis component is efficiently anionized, and the detection sensitivity of the analyzer 40 is improved.

Other configurations are the same as in the first to third embodiments. Also, the description about the first to third embodiments applies to the fourth embodiment unless inconsistency occurs.

DESCRIPTION OF REFERENCE NUMERALS

2: Electron emission element
3: Lower electrode
4: Surface electrode
5: Intermediate layer
6: Detector
7: Electric field generator
8: Electrostatic gate electrode
9, 9a to 9h: Electric field generating electrode
10: Ionization region
11: Drift region
12: Controller
15: Drift gas injection port
16: Sample injection port
20: Exhaust port
21: Opening
22: Element holder
25: Grid electrode
28: Casing
29: Insulator
30: Analysis chamber
40: Analyzer

What is claimed is:
1. An analyzer comprising:
  an electron emission element;
  a detector;
  an electric field generator that is provided to generate a potential gradient in a region between the electron emission element and the detector;
  an electrostatic gate electrode disposed between the electron emission element and the detector; and
  a controller, wherein
  the electron emission element is provided to include a lower electrode, a surface electrode, and an intermediate layer disposed between the lower electrode and the surface electrode, and to emit electrons by applying a voltage between the lower electrode and the surface electrode, and is provided directly or indirectly to generate anions by electrons emitted in an ionization region between the electron emission element and the electrostatic gate electrode,
  the electrostatic gate electrode is provided to control injection of the anions into a drift region between the electrostatic gate electrode and the detector,
  the detector is provided to detect the anions that moves through the drift region by the potential gradient, and
  the controller is provided to apply a pulse voltage between the lower electrode and the surface electrode, and is provided to apply a voltage to the electrostatic gate electrode such that the electrostatic gate electrode injects the anions into the drift region during a time when the pulse voltage is on.

2. The analyzer according to claim 1, wherein the controller is provided to turn off the pulse voltage applied between the lower electrode and the surface electrode at a timing after the injection of the anions into the drift region but before the subsequent injection of the anions into the drift region.

3. The analyzer according to claim 1, wherein the controller is provided to turn off the pulse voltage at a timing between the injection of the anions into the drift region and 10 milliseconds after the injection.

4. The analyzer according to claim 1, wherein a pulse width of the pulse voltage applied between the lower electrode and the surface electrode is 1 millisecond or more and 30 milliseconds or less.

5. The analyzer according to claim 1, wherein the controller is provided to apply a voltage to the electrostatic gate electrode such that the electrostatic gate electrode injects the anions into the drift region at a timing at which a time of half a pulse width has elapsed after the pulse voltage is switched from off to on.

6. The analyzer according to claim 1, the analyzer further comprising:
  a drift gas injection port that is provided to inject a drift gas into the analyzer; and
  an exhaust port that is provided to exhaust a gas in the analyzer, wherein
  the drift gas injection port and the exhaust port are provided such that the drift gas flows from a side of the detector toward a side of the electrostatic gate electrode in the drift region.

7. The analyzer according to claim 6, wherein the exhaust port is provided to exhaust the gas from a first opening on a lateral side of the ionization region.

8. The analyzer according to claim 7, wherein the first opening is disposed such that an end of the first opening on a side of the electron emission element is positioned closer to the electrostatic gate electrode than the electron emission element.

9. The analyzer according to claim 1, wherein the controller is provided to apply a voltage to the electrostatic gate electrode such that a time taken to inject the anions into the drift region is 0.1 microsecond or more and 0.1 millisecond or less.

10. The analyzer according to claim 1, the analyzer further comprising a first sample injection port that is provided to inject a sample into the analyzer, wherein
the first sample injection port is provided to feed the sample into the ionization region from a second opening on a lateral side of the ionization region.

11. The analyzer according to claim 10, wherein the second opening is positioned such that an end of the second opening on a side of the electron emission element is positioned closer to the electrostatic gate electrode than the electron emission element.

12. The analyzer according to claim 1, the analyzer further comprising a second sample injection port that is provided to inject a sample into the analyzer, wherein
the second sample injection port is provided to feed the sample to a side of the ionization region of the electron emission element and a space opposite to the side of the ionization region.

13. An analyzer comprising:

an electron emission element including a lower electrode, a surface electrode, and an intermediate layer disposed between the lower electrode and the surface electrode;

a detector;

an electric field generator that is provided to generate a potential gradient in a region between the electron emission element and the detector;

an electrostatic gate electrode disposed between the electron emission element and the detector; and a second sample injection port that is provided to inject a sample into the analyzer, wherein the second sample injection port is provided to feed the sample to a side of the electrostatic gate electrode of the electron emission element and a space opposite to the side of the electrostatic gate electrode.

\* \* \* \* \*